(12) United States Patent
Porter

(10) Patent No.: US 11,235,398 B2
(45) Date of Patent: Feb. 1, 2022

(54) TREPANNING TOOL WITH PLUG MANAGEMENT

(71) Applicant: Cutting Edge Tools Inc., Brantford (CA)

(72) Inventor: Robin Porter, Brantford (CA)

(73) Assignee: Cutting Edge Tools Inc., Brantford (CA)

( * ) Notice: Subject to any disclaimer, the term of this patent is extended or adjusted under 35 U.S.C. 154(b) by 16 days.

(21) Appl. No.: 16/814,323

(22) Filed: Mar. 10, 2020

(65) Prior Publication Data

US 2021/0283697 A1    Sep. 16, 2021

(51) Int. Cl.
    *B23B 51/04*    (2006.01)
(52) U.S. Cl.
    CPC ...... *B23B 51/0406* (2013.01); *B23B 2251/14* (2013.01); *B23B 2251/428* (2013.01)
(58) Field of Classification Search
    CPC . B23B 51/04; B23B 51/0406; B23B 51/0413; B23B 51/044; B23B 51/0453; B23B 2251/428; B23B 2251/14; B23B 2226/33; B23B 2226/39; Y10T 408/895; Y10T 408/8953; Y10T 408/896; B28D 1/04; B28D 1/041; B28D 1/146
    USPC ..................................... 175/403, 404; 125/20
    See application file for complete search history.

(56) References Cited

U.S. PATENT DOCUMENTS

| 52,180 | A | | 1/1866 | Leeds et al. |
| 676,720 | A | * | 6/1901 | Kollmyer ............ B23B 51/0406 |
| | | | | 408/205 |
| 1,882,906 | A | | 10/1932 | Renfer |
| 2,626,667 | A | | 1/1953 | Spiller |
| 3,130,763 | A | | 4/1964 | Schlosser et al. |
| 3,216,153 | A | | 11/1965 | Saville et al. |
| 4,258,808 | A | | 3/1981 | Peetz et al. |
| 4,653,336 | A | | 3/1987 | Vollweiler |
| 4,779,689 | A | | 10/1988 | Paxton, III |
| 6,273,652 | B1 | * | 8/2001 | Wirth, Jr. ............ B23B 51/0406 |
| | | | | 408/203.5 |

(Continued)

FOREIGN PATENT DOCUMENTS

| DE | 868069 | C | * | 2/1953 | ......... B23B 51/0406 |
| GB | 961288 | A | * | 6/1964 | ............. B28D 1/041 |

*Primary Examiner* — Eric A. Gates
*Assistant Examiner* — Chwen-Wei Su
(74) *Attorney, Agent, or Firm* — Bereskin & Parr LLP/S.E.N.C.R.L., s.r.l.

(57) ABSTRACT

A trepanning apparatus, including a shaft portion extending along a longitudinal axis; an annular cutter portion; and a connecting portion extending axially between the shaft portion and the cutter portion, the connecting portion including a pair of arms each having a front end connected to the cutter portion and a rear end connected to the shaft portion, the arms circumferentially spaced from one another about the longitudinal axis to provide diametrically opposed first and second openings, a first plug retaining surface defined by a first portion of the rearward end of the cutter portion having a first circumferential extent bounded by the front ends of the arms, and a second plug retaining surface defined by a second portion of the rearward end of the cutter portion having a second circumferential extent bounded by the front ends of the arms, the first circumferential extent greater than the second circumferential extent.

15 Claims, 2 Drawing Sheets

(56) References Cited

U.S. PATENT DOCUMENTS

2010/0243332 A1    9/2010   Paxton, III
2012/0181088 A1    7/2012   Tucceri
2013/0022421 A1    1/2013   Markwald et al.

\* cited by examiner

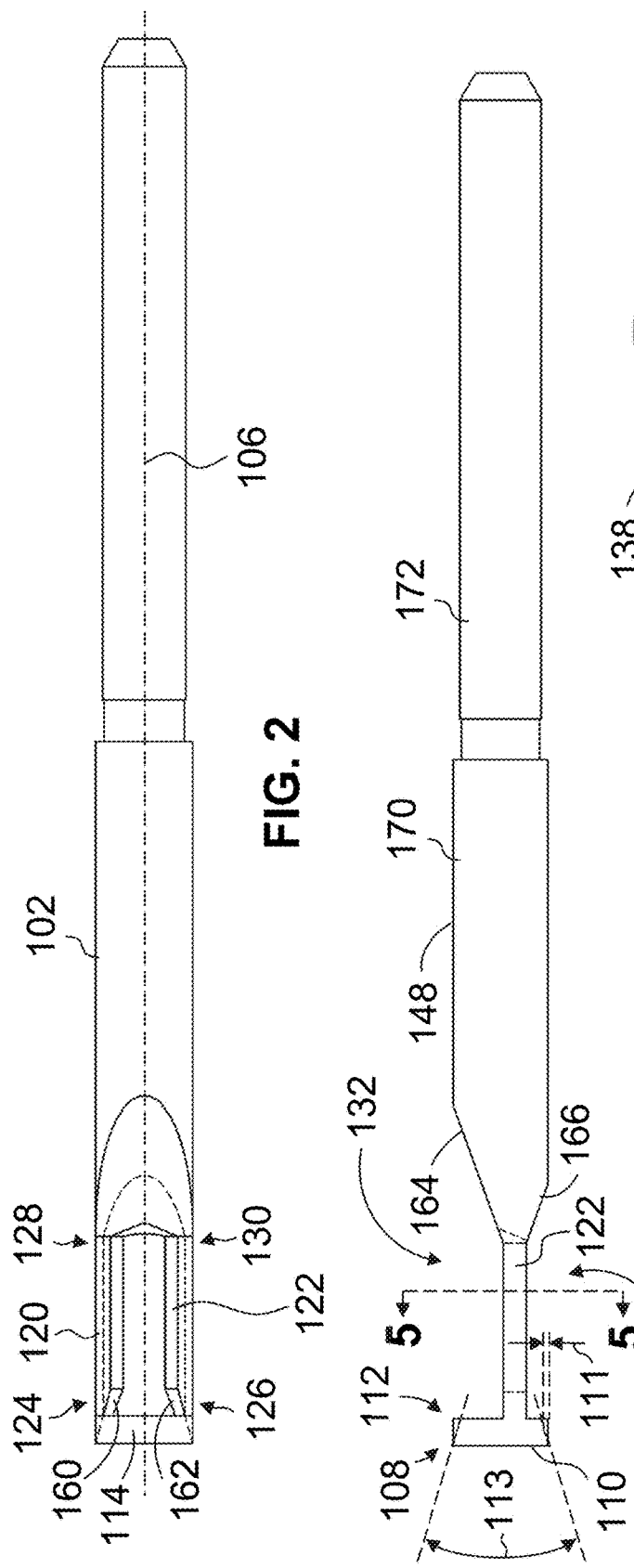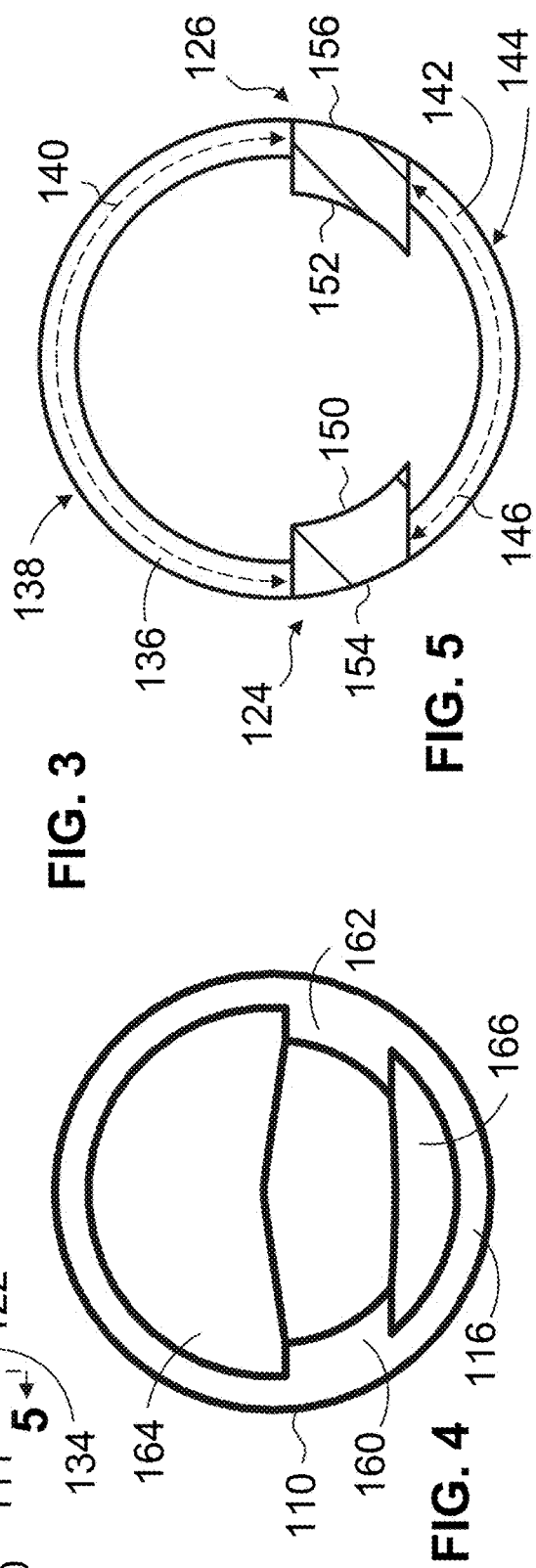

TREPANNING TOOL WITH PLUG MANAGEMENT

FIELD

The specification relates generally to apparatuses and methods associated with drilling, and more specifically, to a trepanning style tool with plug management.

BACKGROUND

U.S. Pat. No. 2,626,667 (Spiller) purports to disclose a hollow drill of the type used for forming holes in paper, leather, and other materials where the holes are either to be used as such, or in conjunction with additional slotting or slitting operations. The drill for such use comprises a hollow body having an inwardly beveled bottom cutting edge and an upper shank portion which is adapted to be gripped in suitable holding means carried by the drill head spindle in such manner that the drill is firmly secured and maintained in place when in operative position but is adapted to be quickly and easily removed when desired, the operation of removing and replacing the drill in proper and accurate operative position being simply and easily performed.

U.S. Pat. No. 3,216,153 (Saville et al.) purports to disclose a trepanning tool which includes a tubular operative portion with, at the end remote from its leading cutting edge, a contiguous, coaxial, tubular extension of larger internal diameter provided with at least one window in its cylindrical wall through which a core formed by the drilling operation, and raised to the level of the window during a subsequent drilling operation, will be expelled centrifugally. In this way the subsequent drilling operations cause the cores formed during the preceding ones automatically to be expelled while the machine is running.

U.S. Pat. App. No. 2013 0022421 (Markwald et al.) purports to disclose a coring bit accessory for a rotary tool, including a shank for coupling with a rotary tool, a body including a generally cylindrical structure having a proximal end portion defining a leading rim, an abrasive ring bonded to or incorporated into the leading rim, and at least one abrasive strip bonded to or incorporated into the body and extending from the proximal end portion to the distal end of the body.

SUMMARY

The following summary is intended to introduce the reader to various aspects of the applicant's teaching, but not to define any invention.

According to some aspects, there is provided a trepanning apparatus, comprising a shaft portion extending along a longitudinal axis; an annular cutter portion spaced axially forward of, and coaxial with, the shaft portion, the cutter portion having a forward end for supporting a cutting surface and a rearward end axially rearward of the forward end, and the cutter portion having a generally cylindrical radially outer surface and a radially inner surface opposite the radially outer surface; and a connecting portion extending axially between the shaft portion and the cutter portion, the connecting portion including a pair of arms each having a front end connected to the cutter portion and a rear end connected to the shaft portion, the arms circumferentially spaced from one another about the longitudinal axis to provide diametrically opposed first and second openings on opposed sides of the longitudinal axis, and wherein a first plug retaining surface is defined by a first portion of the rearward end of the cutter portion having a first circumferential extent bounded by the front ends of the arms and aligned with the first opening, and wherein a second plug retaining surface is defined by a second portion of the rearward end of the cutter portion having a second circumferential extent bounded by the front ends of the arms and aligned with the second opening, the first circumferential extent greater than the second circumferential extent.

In some examples, the first circumferential extent is at least 170 degrees.

In some examples, the first circumferential extent is at least 180 degrees.

In some examples, the shaft portion has a generally cylindrical outer shaft surface, with a first planar tapered surface centered about the first opening and inclined laterally from the outer shaft surface towards the rear ends of the arms in a forward direction along the longitudinal axis.

In some examples, the shaft portion has a second planar tapered surface opposite the first planar tapered surface and centered about the second opening, the second planar tapered surface inclined laterally from the outer shaft surface towards the rear ends of the arms in a forward direction along the longitudinal axis, the second tapered surface having a shorter longitudinal and lateral extent than that of the first planar tapered surface.

In some examples, the radially inner surface of the cutter portion is tapered radially inward in a rearward direction along the axis, the spacing between the radially inner and outer surfaces defining a wall thickness of the cutter portion, the wall thickness greater at the rearward end than at the forward end.

In some examples, the outside diameter of the cutter portion is constant between the forward and rearward ends.

In some examples, each arm of the pair of arms has a radially inner arm surface and a radially outer arm surface, the radially outer arm surface curved about the axis and aligned with the cylindrical radially outer surface of the cutter portion.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 2 is a top plan view of the trepanning tool of FIG. 1;

FIG. 3 is a side elevation view of the trepanning tool of FIG. 1;

FIG. 4 is an end elevation view of the forward end of the trepanning tool of FIG. 1; and FIG. 5 is a cross sectional view of the trepanning tool of FIG. 1, taken along line 5-5 of FIG. 3.

DETAILED DESCRIPTION

Figure 1:
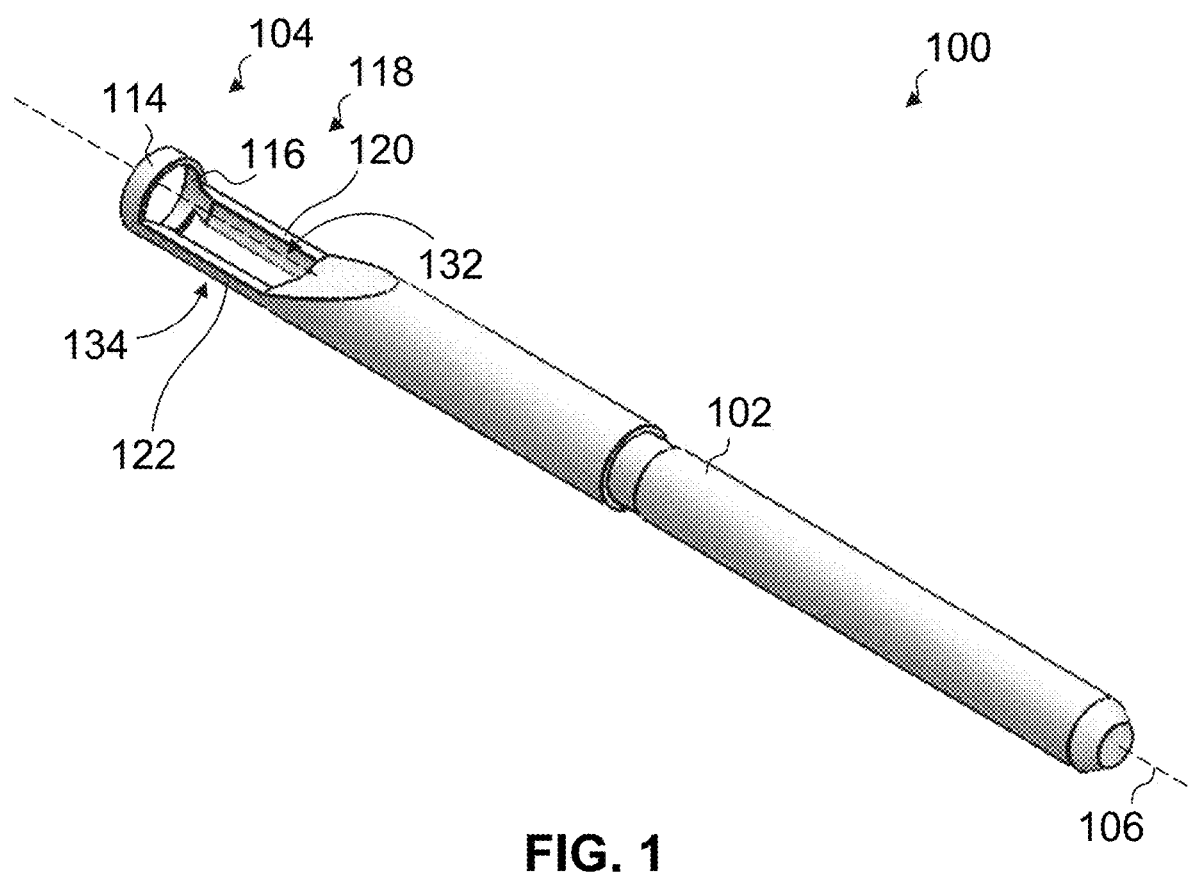
FIG. 1 is perspective top view of a trepanning tool, in accordance with an embodiment.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

Referring to FIG. 1, an example of a trepanning apparatus or tool 100 for cutting a hole in a workpiece is illustrated. The trepanning tool 100 forms a hole by making an annular cut having a desired outer diameter. A core or plug of material is formed internally of the annular cut. This method can reduce the amount energy required to form the hole, and can also or alternatively facilitate providing clean holes in softer materials. However, this method can cause problems if the plug is not removed from the workpiece, and/or if the plug is not cleared from the tool.

The trepanning tool 100 can facilitate satisfactory plug management, by, for example, retaining the plug in the trepanning tool to withdraw the plug from the workpiece, and/or ejecting the plug from the trepanning tool when sufficiently clear of the workpiece. In some examples, the trepanning tool 100 may be provided with retaining surfaces to hold the plug in the tool while the tool is withdrawn from the workpiece. The retaining surfaces can include axially rearwardly directed surfaces disposed on diametrically opposing sides of the tool axis. In some examples, the tool may have side openings axially rearward of the cutting edge and retaining surfaces to facilitate ejection of the plug from the tool via centrifugal force as the tool spins about its axis and is withdrawn sufficiently clear of the workpiece.

In some examples, the trepanning tool is optimized for cutting a workpiece that is of a soft sponge material. In some examples, the trepanning tool is optimized for cutting a work piece that is of a dense rubber material. In some examples, the trepanning tool is optimized to cleanly cut holes in a variety of materials including a dense rubber material and a soft sponge material, where the dense rubber material is less compressible than the sponge material. In some examples, the trepanning tool is configured such that a plug that is cut from a work piece is thrown clear after a single cut. In some examples, a plug that is cut from a work piece remains until it is pressed upwards by one or more subsequent plugs cut from the workpiece and/or another workpiece. In some examples, the trepanning tool is optimized for cutting a workpiece that is between 0.5 millimeters and 4.0 millimeters thick. In some examples, when cutting a workpiece having a thickness of about 4.0 millimeters, the trepanning tool is configured to throw the plug clear of the tool and workpiece after a single pass. In some examples, when cutting a workpiece having a thickness of about 0.5 millimeters, the trepanning tool is configured to hold a newly cut plug in the tool until the plug is pressed upwards by one or more subsequent plugs cut in subsequent cutting operations. In some examples, the trepanning tool is optimized to cut a work piece that is of a rubber moisture seal material. In some examples, a trepanning apparatus 100 is mounted in-line on a rubber extrusion line forming the workpiece.

In some examples, the trepanning tool 100 may be used to cut a hole in a workpiece of rubber sponge material. In some examples, a trepanning tool 100 may spin about its axis at a speed of 30,000 to 100,000 revolutions per minute. In some examples, a speed of at least 30,000 revolutions per minute reduces tearing of a material. In some examples, a speed of at least 50,000 revolutions per minute reduces tearing of a material. In some examples, a soft sponge material may be cut more cleanly by a higher speed.

In some examples, the tool 100 may have a leading cutting edge that engages the rubber sponge material while spinning about its axis at a speed of 30,000 to 100,000 revolutions per minute. The plug of rubber sponge material may be held within the trepanning tool 100 as the trepanning tool is withdrawn from the rubber sponge work piece. Once the trepanning tool, or an opening in the side of the trepanning tool, is clear of the work piece, the plug may be ejected by centrifugal force from the tool through the opening in the side of the trepanning tool.

Referring again to FIG. 1, in the example illustrated, the trepanning tool 100 includes a shaft portion 102 and an annular cutter portion 104. The shaft portion 102 is generally configured for mounting the tool 100 in a rotary drive, such as a drill chuck. In some examples, a drill chuck is a drill collet. The shaft portion 102 extends along a longitudinal axis 106.

The annular cutter portion 104 of the illustrated embodiment is spaced axially forward of the shaft portion 102, and is coaxial with the shaft portion 102. The cutter portion 104 has, in the example illustrated, a front cutting edge sized to produce a hole of a desired diameter, which is 3.5 mm in the example illustrated. The cutter portion 104 further has an axial extent that is a fraction of the diameter of cutter portion 104. In the example illustrated, the axial extent of the cutter portion is about 1 mm. In some examples, an axial extent of a cutter portion may be 0.3 to 0.5 millimeters.

In the illustrated embodiment, the cutter portion 104 has a generally cylindrical radially outer surface 114 and a radially inner surface 116 opposite the radially outer surface 114 (FIG. 1). The illustrated cutter portion 104 has a forward end 108 for supporting a cutting surface 110 and a rearward end 112 rearward of the forward end 108 (FIG. 3). In the illustrated example, plug retaining surfaces are provided on the rearward end 112 of the cutter portion 104, as described further below. Trepanning tool 100 and/or cutting surface 110 may be formed of a hard metal, such as tool steel.

In the example illustrated, the radially inner surface 116 of the cutter portion 104 is tapered radially inwardly from front to rear along the axis 106. The spacing between the radially inner surface 116 and radially outer surface 114 defines a wall thickness 111 of the cutter portion 104. In the illustrated example, the wall thickness 111 is greater at the rearward end 112 than at the forward end 108, and the inner diameter of the cutter portion 104 is correspondingly greater at the forward end and smaller at the rearward end.

In the example illustrated, the inner surface 116 is inclined at an angle that defines an included angle 113 (e.g. when viewed in cross-section). In the example illustrated, the included angle 113 is about 30 degrees. The inventors have determined that in the example illustrated, providing the included angle 113 at a value of 30 degrees or more provides satisfactory durability and/or life of the tool. In some examples, angle 113 may be as large as 45° or may be as small as about 20°. A larger included angle 113 may improve tool durability, while a smaller included angle 113 may improve cutting performance. In some examples, the cutting surface is a knife edge, extending continuously about the periphery of the front end of the cutter portion. In some examples, providing the cutting edge free of teeth or serrations can help to improve tool life.

In the example illustrated, the radially outer surface 114 of the cutter portion 104 is cylindrical, defining an outside diameter of the cutter portion 102 that is constant between forward and rearward ends 108, 112.

A connecting portion 118 extends axially between the shaft portion 102 and the cutter portion 104. The connecting portion 118 generally transfers rotational and axial force between the shaft portion 102 and the cutter portion 104, and may include a plurality of arms extending between the two portions. In the illustrated embodiment, the connecting portion 118 includes a pair of arms 120, 122. Each arm 120, 122 has a front end 124, 126 connected to the cutter portion 104 and a rear end 128, 130 connected to the shaft portion 102.

In the example illustrated, the arms 120, 122 are circumferentially spaced from one another about the longitudinal axis 106 to provide diametrically opposed first and second openings 132, 134 on opposed sides of the longitudinal axis 106. The first and second openings 132, 134 are, in the example illustrated, bounded circumferentially by respective longitudinal edges of the arms. In some examples, the circumferential spacing between arms may be occluded by, for example, a wall portion of reduced radial thickness abutting a retaining surface at a forward end of the wall and collinear with an outer surface of cutter portion 102. In some examples, a tool has first and second openings diametrically opposite one another.

Referring to FIG. 5, in the illustrated example a first plug retaining surface 136 is defined by a first portion 138 of the rearward end 112 of the cutter portion 104. The first plug retaining surface 136 has a first circumferential extent 140 bounded by the front ends 124, 126 of the arms 120, 122 and aligned with the first opening 132. A second plug retaining surface 142 is defined by a second portion 144 of the rearward end 112 of the cutter portion 104. The second plug retaining surface 142 has a second circumferential extent 146 bounded by the front ends 124, 126 of the arms 120, 122 and aligned with the second opening 134. In some examples, a radial thickness of a cutting portion between a radially outer surface 114 and a radial inner surface 116 at a rearward is at least 0.3 millimeters.

In the illustrated example, the first circumferential extent 140 is greater than the second circumferential extend 146. This facilitates, in some examples, desired ejection of the plug from the tool by passing the plug radially through the first opening. In some embodiments, the first circumferential extent 140 may be greater than 170° or greater than 180°. In the example illustrated, the first circumferential extent is about 200 degrees and the second circumferential extent is about 100 degrees. The front ends of the arms each have a circumferential extent of about 30 degrees.

In the example illustrated, the arms 120, 122 each have a radially inner arm surface 150, 152 and a radially outer arm surface 154, 156 (FIG. 5) opposite the inner surface. The radially outer arm surface 154, 156 is, in the example illustrated, curved about the axis 106 and aligned with the cylindrical radially outer surface 114 (FIG. 2) of the cutter portion 102. In the example illustrated, the inner arm surfaces 150, 152 are also curved, concentric with the axis 106 and the outer surfaces 154, 156. The inner arm diameter formed by the concentric radially inner arm surfaces is, in the example illustrated, about 70 percent of the outer arm diameter formed by the concentric radially outer arm surfaces. In the example illustrated, each arm, at least where the arm connects to the shaft, has a greater radial thickness than the radial thickness of the cutter portion. The relatively greater thickness of the arms can help withstand forces exerted on the arms during use of the tool.

Referring to FIGS. 2 and 4, arms 120, 122 may also include a tapered forward portion, with the inner surface of each arm tapering inwards (towards the axis 106) from a front end to a rear end of the tapered portion. The tapered forward portions can assist in plug handling within the trepanning device 100. In the example illustrated, the arms 120, 122 each include respective tapered surfaces 160, 162 at the forward ends 124, 126 of the arms. The tapered surfaces 160, 162 are oriented to form an included angle relative to each other, and in the example illustrated, are continuous extensions of the tapered radially inner surface 116 of the cutter portion at included angle 113.

Referring to FIG. 3, the illustrated shaft portion 102 has a generally cylindrical outer shaft surface 148. In some examples, the shaft portion is provided with one or more notches or cut-outs in the outer surface to remove material in discrete, asymmetrical locations about this axis. This can assist in balancing the tool when rotating at high speeds during use. In the example illustrated, the outer surface of the shaft portion 102 has notches providing a first planar tapered surface 164 centered about the first opening 132 and inclined laterally from the outer shaft surface 148 towards the rear ends 128, 130 of the arms 120, 122 in a forward direction along the longitudinal axis 106.

The outer surface of the shaft portion 102 also has a second planar tapered surface 166 opposite the first planar tapered surface 164 and centered about the second opening 134. The second planar tapered surface 166 is inclined laterally from the outer shaft surface 148 towards the rear ends 128, 130 of the arms 120, 122 in a forward direction along the longitudinal axis 106. In the example illustrated, the notch forming the second tapered surface is smaller than the notch forming the first planar surface, removing a lower volume of material form the shaft than the first notch. The second tapered surface 166 has a shorter longitudinal and lateral extent than that of the first planar tapered surface 164.

Referring to FIG. 3, in some examples the shaft portion 102 may include a forward portion 170 having a shaft first diameter and a rearward portion 172 having a shaft second diameter different than the shaft first diameter. In the example illustrated, the shaft first diameter generally matches the outer diameter of the cutter portion. The shaft second diameter is, in the example illustrated, smaller than the shaft first diameter, and is sized to fit in a standard chuck.

The invention claimed is:
1. A trepanning apparatus, comprising:
a) a shaft portion extending along a longitudinal axis;
b) an annular cutter portion spaced axially forward of, and coaxial with, the shaft portion, the cutter portion having a forward end for supporting a cutting surface and a rearward end axially rearward of the forward end, and the cutter portion having a generally cylindrical radially outer surface and a radially inner surface opposite the radially outer surface; and
c) a connecting portion extending axially between the shaft portion and the cutter portion, the connecting portion including a pair of arms each having a front end connected to the cutter portion and a rear end connected to the shaft portion, the arms circumferentially spaced from one another about the longitudinal axis to provide diametrically opposed first and second openings on opposed sides of the longitudinal axis, and
wherein a first plug retaining surface is defined by a first portion of the rearward end of the cutter portion having a first circumferential extent bounded by the front ends of the arms and aligned with the first opening, and wherein a second plug retaining surface is defined by a second portion of the rearward end of the cutter portion having a second circumferential extent bounded by the front ends of the arms and aligned with the second opening, the first circumfer- ential extent greater than the second circumferential extent, and wherein the first circumferential extent is at least 170 degrees.

2. The trepanning apparatus of claim 1, wherein the first circumferential extent is at least 180 degrees.

3. The trepanning apparatus of claim 1, wherein the shaft portion has a generally cylindrical outer shaft surface, with a first planar tapered surface centered about the first opening and inclined laterally from the outer shaft surface towards the rear ends of the arms in a forward direction along the longitudinal axis.

4. The trepanning apparatus of claim 3, wherein the shaft portion has a second planar tapered surface opposite the first planar tapered surface and centered about the second opening, the second planar tapered surface inclined laterally from the outer shaft surface towards the rear ends of the arms in a forward direction along the longitudinal axis, the second tapered surface having a shorter longitudinal and lateral extent than that of the first planar tapered surface.

5. The trepanning apparatus of claim 1, wherein the radially inner surface of the cutter portion is tapered radially inward in a rearward direction along the axis, the spacing between the radially inner and outer surfaces defining a wall thickness of the cutter portion, the wall thickness greater at the rearward end than at the forward end.

6. The trepanning apparatus of claim 5, wherein the outside diameter of the cutter portion is constant between the forward and rearward ends.

7. The trepanning apparatus of claim 1, wherein each arm of the pair of arms has a radially inner arm surface and a radially outer arm surface, the radially outer arm surface curved about the axis and aligned with the cylindrical radially outer surface of the cutter portion.

8. A trepanning apparatus, comprising:
 a) a shaft portion extending along a longitudinal axis;
 b) an annular cutter portion spaced axially forward of, and coaxial with, the shaft portion, the cutter portion having a forward end for supporting a cutting surface and a rearward end axially rearward of the forward end, and the cutter portion having a generally cylindrical radially outer surface and a radially inner surface opposite the radially outer surface; and
 c) a connecting portion extending axially between the shaft portion and the cutter portion, the connecting portion including a pair of arms each having a front end connected to the cutter portion and a rear end connected to the shaft portion, the arms circumferentially spaced from one another about the longitudinal axis to provide diametrically opposed first and second openings on opposed sides of the longitudinal axis, and
  wherein a first plug retaining surface is defined by a first portion of the rearward end of the cutter portion having a first circumferential extent bounded by the front ends of the arms and aligned with the first opening, and wherein a second plug retaining surface is defined by a second portion of the rearward end of the cutter portion having a second circumferential extent bounded by the front ends of the arms and aligned with the second opening, the first circumferential extent greater than the second circumferential extent, and
  wherein the shaft portion has a generally cylindrical outer shaft surface, with a first planar tapered surface centered about the first opening and inclined laterally from the outer shaft surface towards the rear ends of the arms in a forward direction along the longitudinal axis.

9. The trepanning apparatus of claim 8, wherein the shaft portion has a second planar tapered surface opposite the first planar tapered surface and centered about the second opening, the second planar tapered surface inclined laterally from the outer shaft surface towards the rear ends of the arms in a forward direction along the longitudinal axis, the second tapered surface having a shorter longitudinal and lateral extent than that of the first planar tapered surface.

10. The trepanning apparatus of claim 8, wherein the radially inner surface of the cutter portion is tapered radially inward in a rearward direction along the axis, the spacing between the radially inner and outer surfaces defining a wall thickness of the cutter portion, the wall thickness greater at the rearward end than at the forward end.

11. The trepanning apparatus of claim 10, wherein the outside diameter of the cutter portion is constant between the forward and rearward ends.

12. The trepanning apparatus of claim 8, wherein each arm of the pair of arms has a radially inner arm surface and a radially outer arm surface, the radially outer arm surface curved about the axis and aligned with the cylindrical radially outer surface of the cutter portion.

13. A trepanning apparatus, comprising:
 a) a shaft portion extending along a longitudinal axis;
 b) an annular cutter portion spaced axially forward of, and coaxial with, the shaft portion, the cutter portion having a forward end for supporting a cutting surface and a rearward end axially rearward of the forward end, and the cutter portion having a generally cylindrical radially outer surface and a radially inner surface opposite the radially outer surface; and
 c) a connecting portion extending axially between the shaft portion and the cutter portion, the connecting portion including a pair of arms each having a front end connected to the cutter portion and a rear end connected to the shaft portion, the arms circumferentially spaced from one another about the longitudinal axis to provide diametrically opposed first and second openings on opposed sides of the longitudinal axis, and
  wherein a first plug retaining surface is defined by a first portion of the rearward end of the cutter portion having a first circumferential extent bounded by the front ends of the arms and aligned with the first opening, and wherein a second plug retaining surface is defined by a second portion of the rearward end of the cutter portion having a second circumferential extent bounded by the front ends of the arms and aligned with the second opening, the first circumferential extent greater than the second circumferential extent, and
  wherein the radially inner surface of the cutter portion is tapered radially inward in a rearward direction along the axis, the spacing between the radially inner and outer surfaces defining a wall thickness of the cutter portion, the wall thickness greater at the rearward end than at the forward end.

14. The trepanning apparatus of claim 13, wherein the outside diameter of the cutter portion is constant between the forward and rearward ends.

15. The trepanning apparatus of claim 13, wherein each arm of the pair of arms has a radially inner arm surface and a radially outer arm surface, the radially outer arm surface curved about the axis and aligned with the cylindrical radially outer surface of the cutter portion.

* * * * *